(12) United States Patent
Gregoire

(10) Patent No.: US 8,830,129 B2
(45) Date of Patent: Sep. 9, 2014

(54) DIELECTRIC ARTIFICIAL IMPEDANCE SURFACE ANTENNA

(75) Inventor: Daniel J. Gregoire, Thousand Oaks, CA (US)

(73) Assignee: HRL Laboratories, LLC, Malibu, CA (US)

(*) Notice: Subject to any disclaimer, the term of this patent is extended or adjusted under 35 U.S.C. 154(b) by 239 days.

(21) Appl. No.: 13/427,682

(22) Filed: Mar. 22, 2012

(65) Prior Publication Data

US 2013/0249737 A1  Sep. 26, 2013

(51) Int. Cl.
*H01Q 1/38* (2006.01)
*H01Q 15/00* (2006.01)

(52) U.S. Cl.
CPC ......... *H01Q 15/0006* (2013.01); *H01Q 15/006* (2013.01)
USPC .................................... 343/700 MS; 343/909

(58) Field of Classification Search
CPC .......................... H01Q 15/0006; H01Q 15/006
USPC .......................................... 343/700 MS, 909
See application file for complete search history.

(56) References Cited

U.S. PATENT DOCUMENTS

| | | | |
|---|---|---|---|
| 7,218,281 B2 * | 5/2007 | Sievenpiper et al. | 343/700 MS |
| 7,830,310 B1 * | 11/2010 | Sievenpiper et al. | 343/700 MS |
| 7,911,407 B1 * | 3/2011 | Fong et al. | 343/909 |
| 2007/0001909 A1 * | 1/2007 | Sievenpiper et al. | 343/700 MS |
| 2009/0002240 A1 * | 1/2009 | Sievenpiper et al. | 343/700 MS |
| 2010/0156749 A1 * | 6/2010 | Kim et al. | 343/866 |

FOREIGN PATENT DOCUMENTS

| | | |
|---|---|---|
| JP | 05-199034 | 8/1993 |
| JP | 06-069717 | 3/1994 |
| JP | 06-112730 | 4/1994 |
| JP | 07-142916 | 6/1995 |
| KR | 10-2004-0026205 | 3/2004 |

OTHER PUBLICATIONS

ISR and WO for related PCT/US2013/031079 mailed on Jun. 27, 2013.
D. Gregoire and J. Colburn, "Artificial impedance surface antenna design and simulation", Proc. 2010 Antenna Applications Symposium, pp. 288.
J. S. Colburn et al., "Scalar and Tensor Artificial Impedance Surface Conformal Antennas", 2007 Antenna Applications Symposium, pp. 526-540.
B.H. Fong et al, "Scalar and Tensor Holographic Artificial Impedance Surfaces", IEEE Trans. Antennas Propag., accepted for publication, 2010.
U.S. Appl. No. 13/752,195, filed Jan. 28, 2013, Gregoire.
From U.S. Appl. No. 13/752,195, Application and Office Actions.
From U.S. Appl. No. 13/931,097, Application and Office Actions.
From U.S. Appl. No. 14/092,276, Application and Office Actions.
PCT International Preliminary Report on Patentability (Chapter II) mailed on Feb. 7, 2014 for related PCT Application No. PCT/US2013/031079.
Collin, "Field theory of guided waves, 2nd Ed.", IEEE Press, 1996, pp. 705-708.

(Continued)

*Primary Examiner* — Hoanganh Le
(74) *Attorney, Agent, or Firm* — Ladas & Parry

(57) ABSTRACT

A dielectric artificial impedance surface antenna (DAISA) including a dielectric with a thickness, the dielectric thickness varying to provide a modulated impedance to a signal traversing the dielectric, the dielectric having a first surface, and a second surface opposite the first surface.

24 Claims, 9 Drawing Sheets

(56) References Cited

OTHER PUBLICATIONS

Gregoire and Colburn, *Artificial impedance surface antenna design and simulation,* Proc. Antennas Appl. Symposium 2010, pp. 288-303.

Gregoire and Colburn, *Artificial impedance surface antennas,* Proc. Antennas Appl. Symposium 2011, pp. 460-475.

Luukkonen et al, "Simple and accurate analytical model of planar grids and high-impedance surfaces comprising metal strips or patches", IEEE Trans. Antennas Prop., vol. 56, 1624, 2008.

Minatti and Maci et al, "Spiral Leaky-Wave Antennas Based on Modulated Surface Impedance", IEEE Trans. on Antennas and Propagation, vol. 59, No. 12, Dec. 2011.

Patel, A.M.; Grbic, A., "A Printed Leaky-Wave Antenna Based on a Sinusoidally-Modulated Reactance Surface," Antennas and Propagation, IEEE Transactions on , vol. 59, No. 6, pp. 2087,2096, Jun. 2011.

Sievenpiper et al, "Holographic AISs for conformal antennas", 29th Antennas Applications Symposium, 2005.

Sievenpiper, 2005 IEEE Antennas and Prop. Symp. Digest, vol. 1B, pp. 256-259, 2005.

* cited by examiner $Z_{SW}(x,y) = X \quad M\cos(2\pi f_0 / ( \ nr - x\sin\theta_0))$

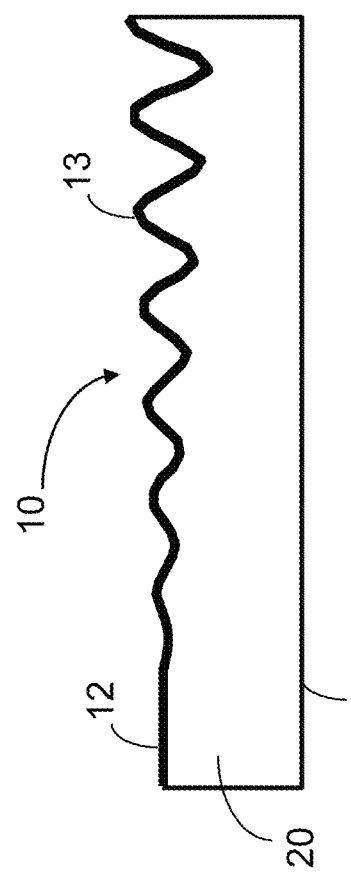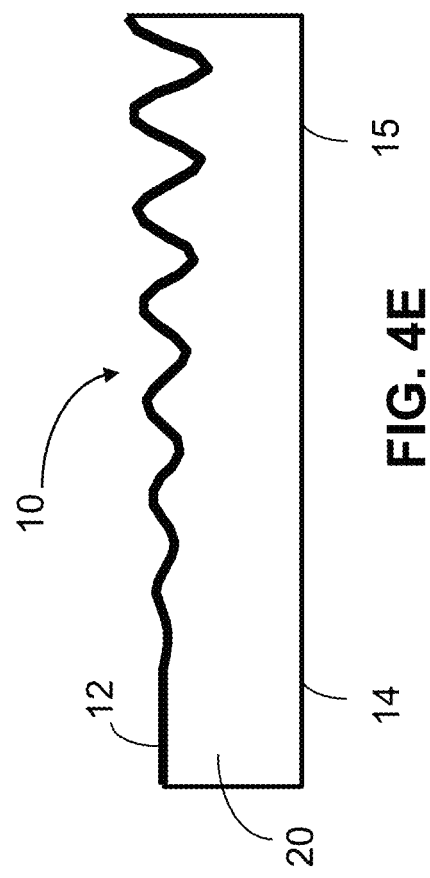

| FORMING A DIELECTRIC WITH A THICKNESS, THE DIELECTRIC THICKNESS VARYING TO PROVIDE A MODULATED A MODULATED IMPEDANCE TO A SIGNAL TRAVERSING THE DIELECTRIC , THE DIELECTRIC HAVING A FIRST SURFACE, AND A SECOND SURFACE OPPOSITE THE FIRST SURFACE | 100 |
|---|---|
| WHEREIN THE STEP OF FORMING A DIELECTRIC COMPRISES STAMPING, MILLING, OR STEREO-LITHOGRAPHY | 102 |

FIG. 8

DIELECTRIC ARTIFICIAL IMPEDANCE SURFACE ANTENNA

CROSS REFERENCE TO RELATED APPLICATIONS

None

TECHNICAL FIELD

This disclosure relates to artificial impedance surface antennas (AISAs).

BACKGROUND

Prior art artificial impedance surface antennas (AISAs) are described by D. Gregoire and J. Colburn, "Artificial impedance surface antenna design and simulation", Proc. 2010 Antenna Applications Symposium, pp. 288, J. S. Colburn et al., "Scalar and Tensor Artificial Impedance Surface Conformal Antennas", 2007 Antenna Applications Symposium, pp. 526-540, and B. H. Fong et al, "Scalar and Tensor Holographic Artificial Impedance Surfaces", IEEE Trans. Antennas Propag., accepted for publication, 2010.

In the prior art, AISAs are fabricated by printing arrays of metallic patches 26 onto a dielectric substrate, as shown in FIG. 1B. The surface-wave impedance modulation is created by the printed grid of metallic patches, whose size varies according to the desired modulation. To operate properly it is critical that the size and placement of metallic patches maintain a strict dimensional tolerance. The dielectric substrate, upon which the metallic patches in the prior art are printed, is typically a high-cost, a high-frequency circuit board material such as Rogers 3010 which costs typically $150/sq. ft. The process of creating the array of square patches requires costly and time-consuming circuit board etching techniques.

What is needed are lower cost artificial impedance surface antennas (AISAs) and a method of fabricating the AISAs that use conventional manufacturing methods to allow for mass production. The embodiments of the present disclosure answer these and other needs.

SUMMARY

In a first embodiment disclosed herein, a dielectric artificial impedance surface antenna (DAISA) comprises a dielectric with a thickness, the dielectric thickness varying to provide a modulated impedance to a signal traversing the dielectric, the dielectric having a first surface and a second surface opposite the first surface.

In another embodiment disclosed herein, a method of fabricating a dielectric artificial impedance surface antenna (DAISA) comprises forming a dielectric with a thickness, the dielectric thickness varying to provide a modulated impedance to a signal traversing the dielectric, the dielectric having a first surface and a second surface opposite the first surface.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 4D shows a dielectric material with a conducting ground plane the first surface, FIG. 4E shows the dielectric material with a conducting ground plane on the second surface.

FIG. 8 is a flow diagram of a method of fabricating a dielectric artificial impedance surface antenna (DAISA) in accordance with the present disclosure.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1B:
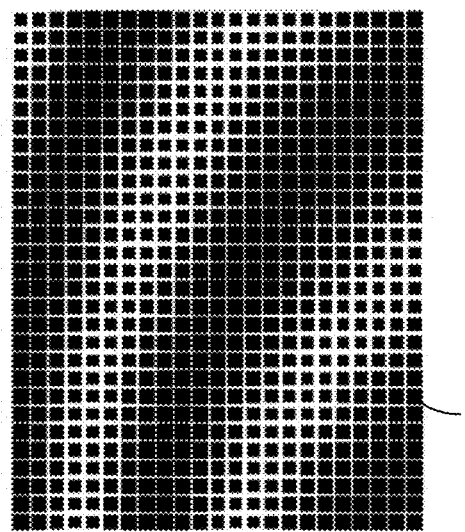
FIG. 1B shows a portion of the artificial impedance surface antenna of FIG. 1A implemented using square metallic patches in accordance with the prior art.
Figure 1A:
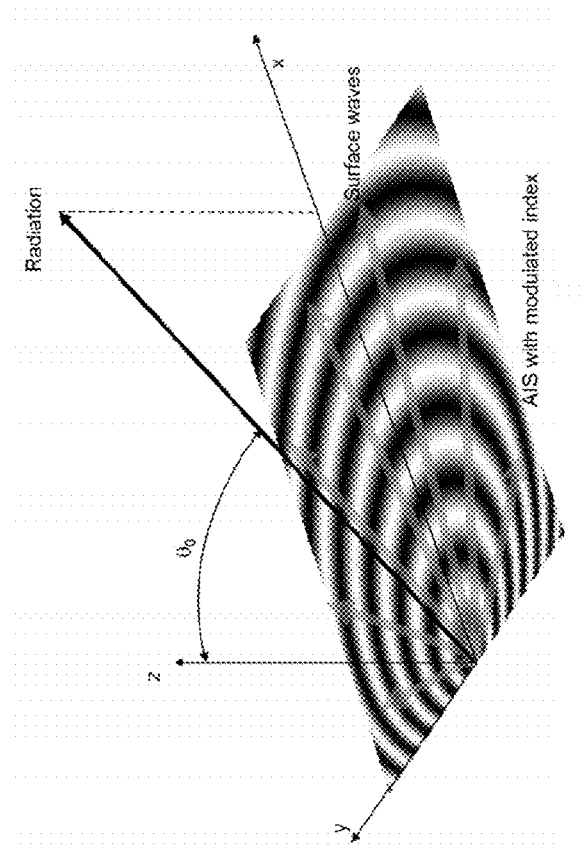
FIG. 1A illustrates the principle for artificial impedance surface antennas in accordance with the prior art.

Artificial impedance surface antennas (AISAs) operate as illustrated in FIG. 1A. A surface wave of a desired frequency is launched across a dielectric with a modulated height of a surface and therefore a modulated impedance. The modulated surface wave impedance of the modulated impedance surface may be described by the following equation.

$$Z_{sw}(x,y) = X + M \cos((2\pi f_0/c)*(nr - x \sin \theta_0))$$

where $Z_{sw}(x,y)$ is the surface wave impedance, x is a one dimension along the surface, y is another dimension along the surface,
X is the average impedance,
M is the maximum surface wave impedance modulation,
$f_0$ is the design frequency of radiation,
$n=(1+X^2)^{1/2}$
c is the speed of light,
r is the radial distance from the feed point
at x=0, y=0, to the coordinates at x, y, and
$\theta_0$ is the design angle of radiation.

The modulated surface wave impedance varies the speed of the surface wave as it propagates across the surface. The electric fields generated by the speed variation leads to EM radiation strongly directed into a desired angle $\theta_0$.

In the prior art, AISAs are fabricated by printing arrays of metallic patches onto a dielectric substrate, which requires strict dimensional tolerance, expensive substrates and costly and time-consuming circuit board etching techniques. FIG. 1B shows a portion of the artificial impedance surface antenna of FIG. 1A implemented using square metallic patches 26 in accordance with the prior art. In FIG. 1B the gaps between the metallic patches 26 vary between 0.2 mm and 1 mm, and high impedance regions have small gaps and are darker.

Figure 3:
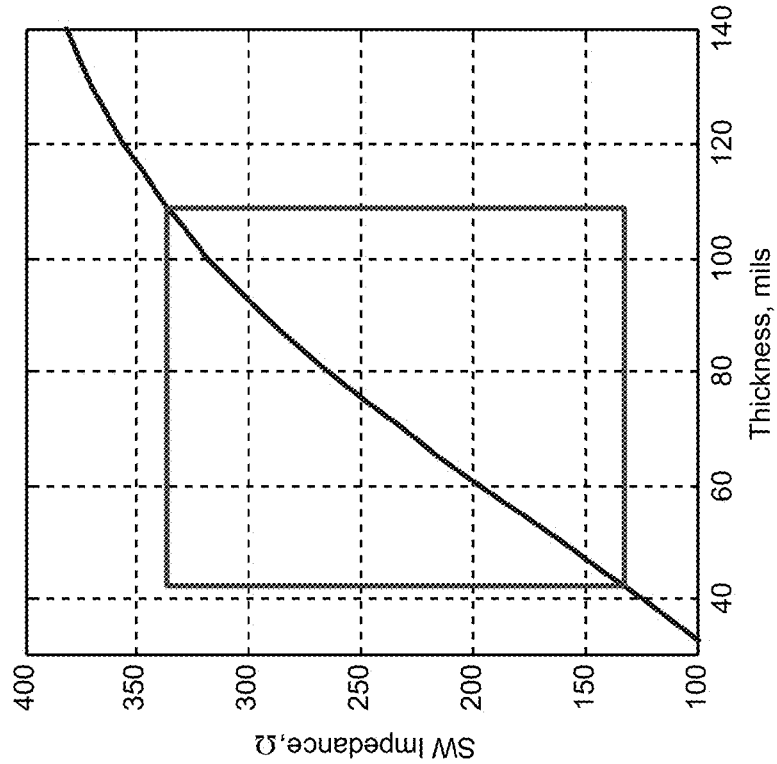
FIG. 3 shows the surface-wave impedance properties of the DAISA of FIG. 2 as a function of its thickness in accordance with the present disclosure.
Figure 2:
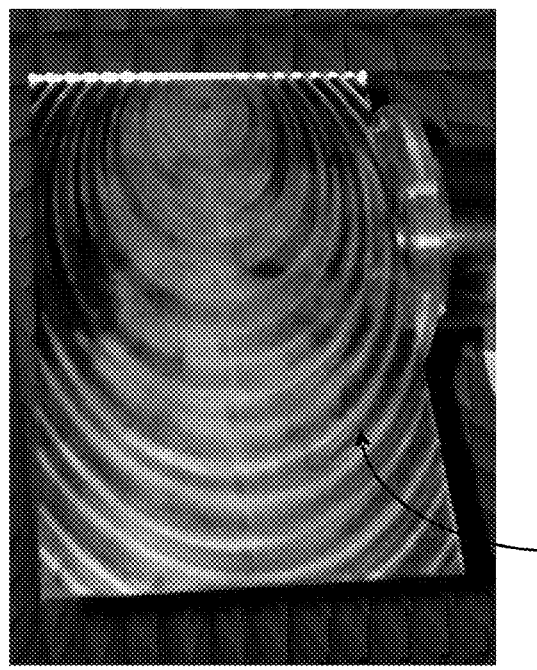
FIG. 2 shows a dielectric artificial impedance surface antenna (DAISA) designed to operate at 24 GHz and radiating predominantly towards 60 degrees off normal in accordance with the present disclosure.

FIG. 2 shows a dielectric artificial impedance surface antenna (DAISA) designed to operate at 24 GHz and radiating predominantly towards 60 degrees off normal in accordance with the present disclosure. FIG. 3 shows the surface-wave impedance properties of the DAISA of FIG. 2 as a function of its thickness in accordance with the present disclosure.

Figures 4A, 4B, 4C:
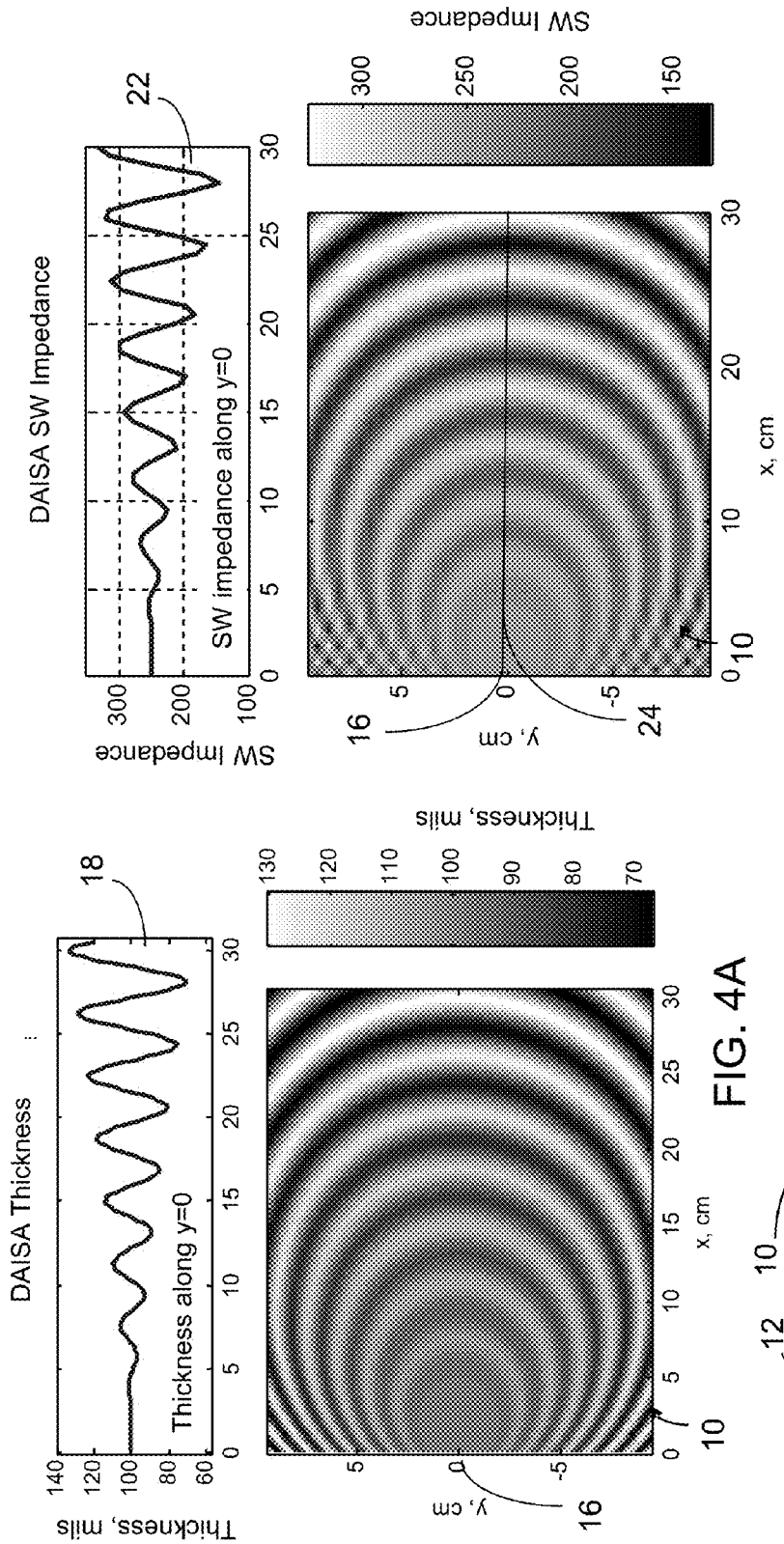
FIG. 4A shows contour and line plots of the thickness of the DAISA of FIG. 2 as a function of position on the DAISA in accordance with the present disclosure.
FIG. 4B shows the corresponding contour and line plots of the surface-wave impedance for the DAISA of FIG. 2 as a function of position on the DAISA in accordance with the present disclosure.
FIG. 4C shows an elevation sectional view of the DAISA of FIG. 2.

FIGS. 4A to 4C show a dielectric artificial impedance surface antenna (DAISA) 10 in accordance with the present disclosure. The DAISA 10 is composed of a sheet of dielectric material 20 that has a modulated thickness that modulates the height of a first surface 12. Modulation diagram 18, shown in FIG. 4A, illustrates how the thickness is modulated. It will be understood by those skilled in the art that a particular modulation depends on the desired frequency and angle of radiation. DAISAs may be designed to radiate at any desired frequency and angle.

The impedance-thickness correlation can be computed using the transverse resonance method. The transverse resonance method for a dielectric sheet is described in R. Collin, "Field theory of guided waves, 2nd Ed.", IEEE Press, 1996, pp. 705-708, which is incorporated herein by reference as though set forth in full.

The DAISA 10 may be planar or have a curvature suitable for conformal mounting on a curved surface, such as, for example, a wing or a nose of an airplane, or a bumper or grill of an automobile. In the case of a planar DAISA, the second surface 14 of the DAISA 10 may be flat. In the case of a conformally mounted DAISA, the second surface 14 may have a curvature suitable for mounting conformally on a curved surface, as shown in FIG. 4G.

Figure 4F:
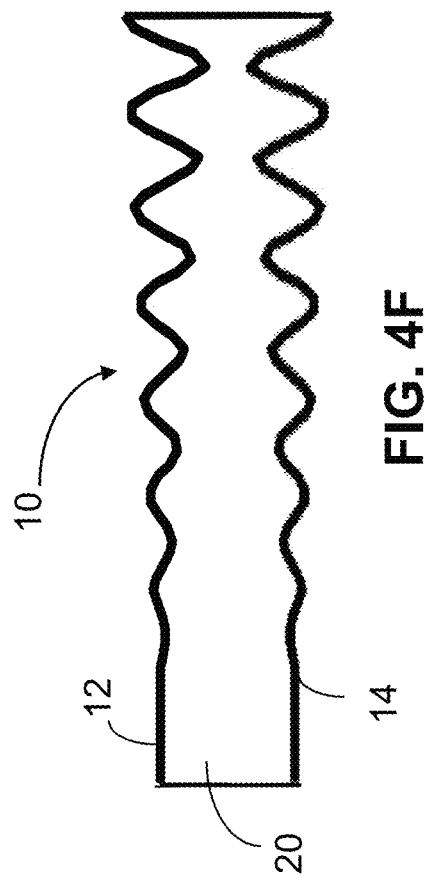
FIG. 4F shows the second surface of the DAISA with a modulated height.
Figure 4G:
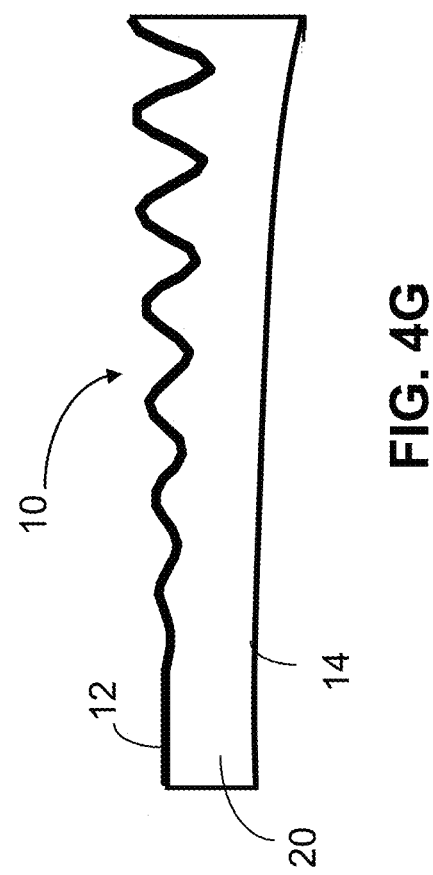
FIG. 4G shows the second surface with a curvature suitable for mounting conformally on a curved surface, in accordance with the present disclosure.

The second surface 14 of the DAISA 10 may also have a modulated height, as shown in FIG. 4F.

The dielectric material 20 may be any non-conducting material such as plastic. Example materials include Lexan®, acrylic, Plexiglas®, and other forms of plastic. The dielectric material 20 may be transparent or may be colored.

The dielectric material 20 may have a conducting ground plane 13 on the first surface 12, as shown in FIG. 4D, or the dielectric material 20 may have a conducting ground plane 15 on the second surface 14, as shown in FIG. 4E. The ground plane may be formed by depositing metal or otherwise coating one of the surfaces with a metallic coating. In some embodiments of DAISAs, there may be no ground plane on either the first or second surface. In this embodiment, no metal coating is required.

The surface wave impedance map 22 shown in FIG. 4B illustrates the impedance modulation along one line 24 from the feed point 16 of the artificial impedance surface antenna (DAISA) 10. The dielectric artificial impedance surface antenna (DAISA) 10 shown in FIGS. 4A to 4C has a design to radiate at a 60 degree angle off normal at 24 GHz.

Figure 7A:
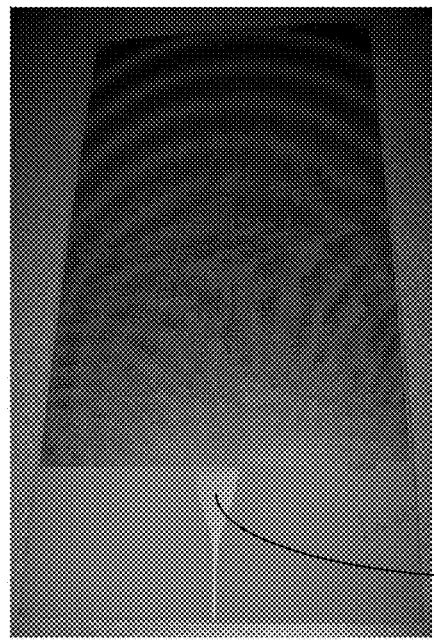
FIGS. 7A and 7B show surface wave feeds for a dielectric artificial impedance surface antenna (DAISA) in accordance with the present disclosure.
Figure 7B:
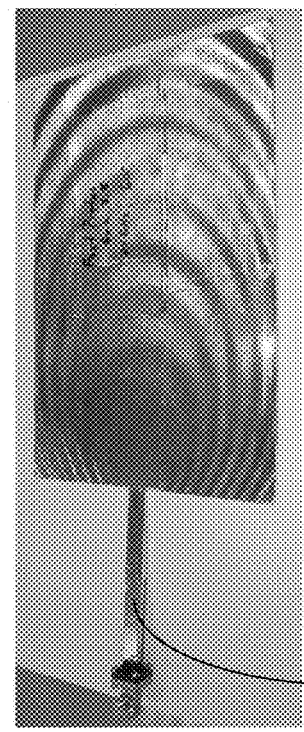

The dielectric artificial impedance surface antenna (DAISA) 10 may be used in either a receive mode or a transmit mode. The surface wave feed, for transmitting a signal to or receiving a signal from the feed point 16 of the DAISA 10 may be a microstrip line 60, as shown in FIG. 7A, a waveguide such as a low profile waveguide 62, shown in FIG. 7B, a microwave horn (not shown), or a dipole extending upward from the first surface 12. The dipole may, for example, be the center conductor of a coaxial cable extending vertically through the feed point and normal to the plane of the DAISA at the feed point 16. The ground conductor of the coaxial cable may be connected to the conducting ground plane, which as discussed above may be either on the first surface 12 or the second surface 14 of the DAISA. The surface-wave feed may launch a transverse magnetic (TM) surface wave or a transverse electric (TE) surface wave.

As described above, FIG. 2 shows a dielectric artificial impedance surface antenna (DAISA) 30 designed to operate at 24 GHz and radiating predominantly towards 60 degrees off normal. The DAISA 30 is fabricated out of 30 cm×20 cm aluminum-backed acrylic. FIG. 3 shows the correlation between the DAISA thickness and the surface-wave impedance. The thickness of DAISA 30 as a function of position is seen in FIG. 4A.

Figure 5B:
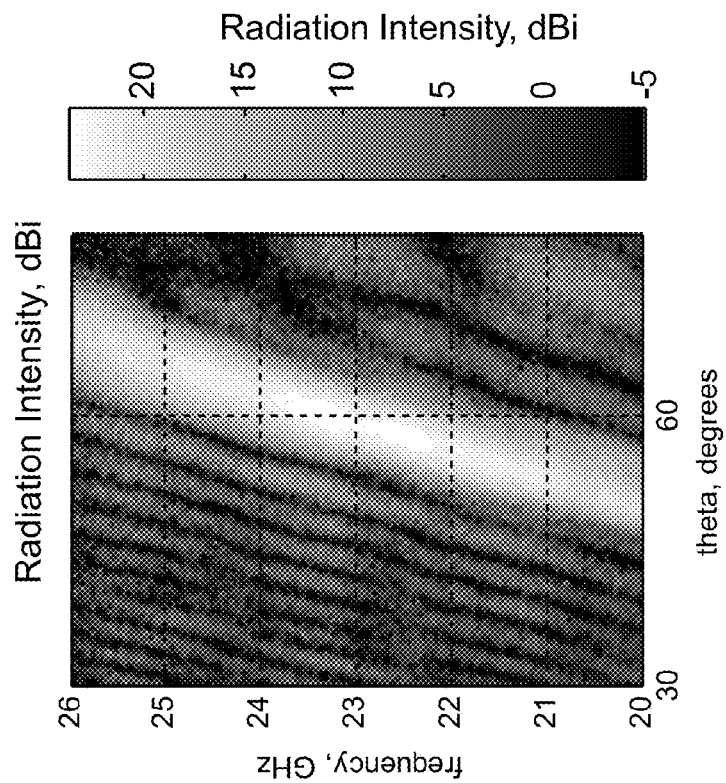
FIG. 5B shows the relative radiation intensity as a function of angle and frequency for the DAISA of FIG. 2 in accordance with the present disclosure.
Figure 5A:
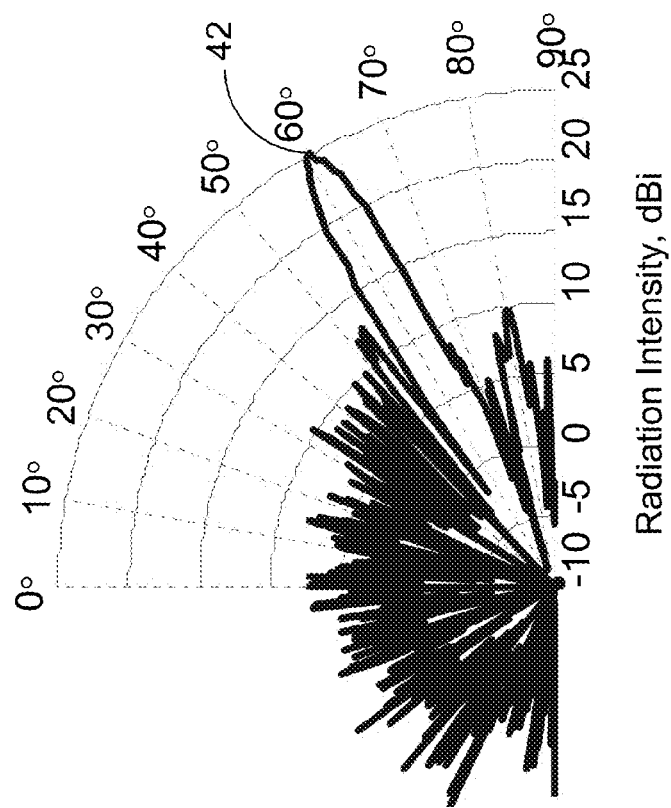
FIG. 5A shows the measured radiation pattern of the DAISA shown in FIG. 2 in accordance with the present disclosure.

FIG. 5A shows the measured realized gain 42 of the radiation pattern of the DAISA 30 shown in FIG. 2. FIG. 5B shows the realized gain as a function of angle and frequency for the DAISA 30.

Figure 6B:
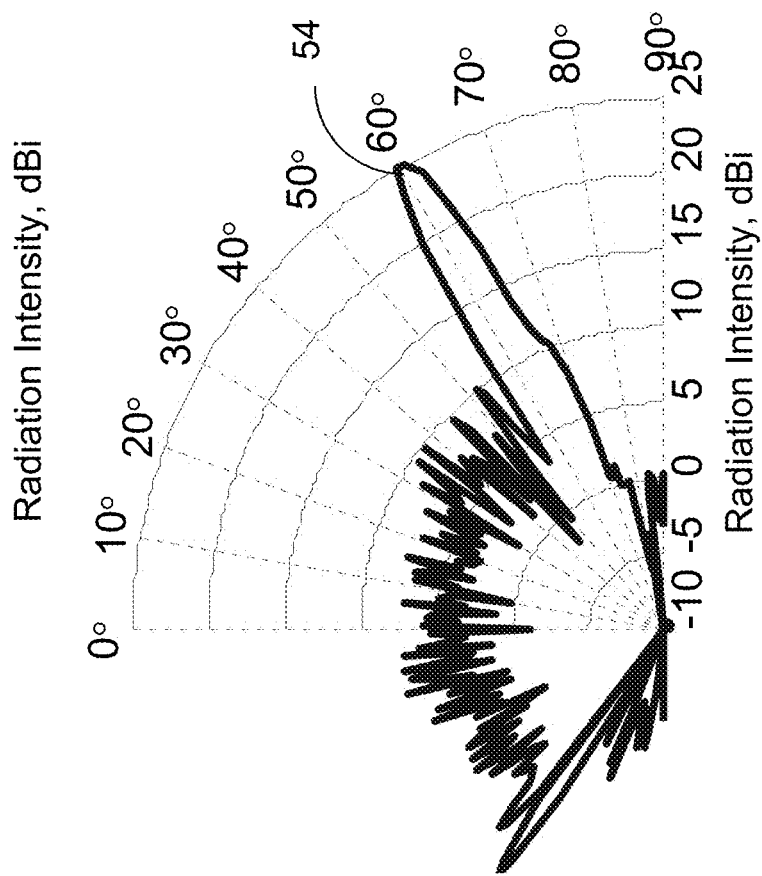
FIG. 6B shows the measured radiation patterns for the DAISA in FIG. 6A in accordance with the present disclosure.
Figure 6A:
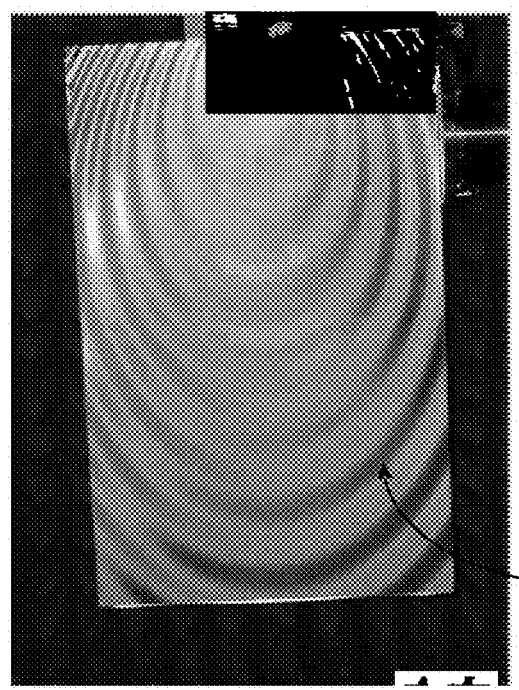
FIG. 6A shows a 60 cm×38 cm DAISA designed to operate at 12 GHz and radiating predominantly towards 60 degrees off normal in accordance with the present disclosure.

FIG. 6A shows a 60 cm×38 cm DAISA 50 designed to operate at 12 GHz and radiating predominantly towards 60 degrees off normal. FIG. 6B shows the measured realized gain 54 for the DAISA 50.

A dielectric artificial impedance surface antenna (DAISA) in accordance with the present disclosure may be fabricated by forming a dielectric material into a shape to form a modulated impedance surface, as shown in step 100 in FIG. 8. In step 100 a dielectric is formed having a varying thickness to provide a modulated impedance to a signal traversing the dielectric, the dielectric having a first surface and a second surface opposite the first surface.

The shape of the dielectric material may be formed by milling, stereo-lithography or by stamping, which is particularly suited for mass production, as shown in step 102. As discussed above, the dielectric material 20 may be any non-conducting material such as plastic, including Lexan®, acrylic, Plexiglas®, and other forms of plastic. The dielectric material 20 may be transparent or may be colored. The DAISA may be formed to mount conformally on a curved surface or be planar. A conductive ground plane may be formed on either the first surface 12 or the second surface 14 of the DAISA by metallic coating, which may be sprayed or deposited. Once the DAISA is fabricated a surface wave feed may be attached to the feed point 16 of the DAISA 10.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A dielectric artificial impedance surface antenna (DAISA) comprising:
    a dielectric having a thickness, the thickness of the dielectric varying to provide a modulated impedance to a signal traversing the dielectric;
    the dielectric having a first surface on the dielectric, and a second surface on the dielectric opposite the first surface;
    wherein the modulated impedance to a signal traversing the dielectric varies according to $$Z_{sw}(x,y)=X+M \cos((2\pi f_0/c)*(nr-x\sin\theta_0))$$

where
        x is a dimension along the first surface,
        y is another dimension along the first surface,
        X is an average impedance,
        M is a maximum surface wave impedance modulation,
        $f_0$ is a design frequency of radiation,
        $n = (1+X^2)^{1/2}$,
        c is a speed of light,
        r is a radial distance from a feed point at x=0, y=0, to a distance to dimensions x, y, and
        $\theta_0$ is an design angle of radiation.

2. The DAISA of claim 1 wherein the DAISA has a substantially planar shape.

3. The DAISA of claim 1 wherein:
    the first surface has a modulated height; and
    the second surface is substantially flat.

4. The DAISA of claim 1 wherein the DAISA has a substantially curved shape suitable for conformal mounting on a curved surface.

5. The DAISA of claim 4 wherein the second surface has a substantially curved shape suitable for conformal mounting on a curved surface.

6. The DAISA of claim 1 wherein:
    the first surface has a modulated height; and
    the second surface has a modulated height.

7. The DAISA of claim 1 wherein the dielectric comprises a non-conducting material.

8. The DAISA of claim 7 wherein the dielectric comprises plastic.

9. The DAISA of claim 1 wherein the dielectric comprises plastic or acrylic.

10. The DAISA of claim 1 wherein the dielectric is transparent or colored.

11. The DAISA of claim 1 further comprising a conducting ground plane on the first surface.

12. The DAISA of claim 1 further comprising a conducting ground plane on the second surface.

13. The DAISA of claim 1 further comprising:
    a feed point at a location on the first surface; and
    a surface wave feed coupled to the feed point.

14. The DAISA of claim 13 wherein the surface wave feed comprises a microstrip line or a waveguide.

15. The DAISA of claim 13 wherein the surface-wave feed is adapted to transmit a transverse magnetic (TM) surface wave across the first surface, or receive a transverse magnetic (TM) surface wave.

16. The DAISA of claim 13 wherein the surface-wave feed is adapted to transmit a transverse electric (TE) surface wave across the first surface, or receive a transverse electric (TE) surface wave.

17. A method of fabricating a dielectric artificial impedance surface antenna (DAISA) comprising:
    forming a dielectric with a thickness, the thickness of the dielectric varying to provide a modulated impedance to a signal traversing the dielectric, the dielectric having a first surface, and a second surface opposite the first surface;
    wherein the modulated impedance to a signal traversing the dielectric varies according to $$Z_{sw}(x,y)=X+M \cos((2\pi f_0/c)*(nr-x\sin\theta_0))$$

where
        x is a dimension along the first surface,
        y is another dimension along the first surface,
        X is an average impedance,
        M is a maximum surface wave impedance modulation,
        $f_0$ is a design frequency of radiation,
        $n = (1+X^2)^{1/2}$,
        c is a speedof light,
        r is a radial distance from a feed point at x=0, y=0, to a distance to dimensions x, y, and
        $\theta_0$ is an design angle of radiation.

18. The method of claim 17 wherein the step of forming a dielectric comprises stamping, milling, or stereo-lithography.

19. The method of claim 17 wherein the dielectric has a substantially planar shape or a substantially curved shape suitable for conformal mounting on a curved surface.

20. The method of claim 17 further comprising forming a conducting ground plane on the first surface.

21. The method of claim 17 further comprising:
    providing a surface wave feed to a feed point at a location on the first surface.

22. The method of claim 21 wherein the surface wave feed comprises a microstrip line or a waveguide.

23. The DAISA of claim 21 wherein the surface-wave feed is adapted to transmit a transverse magnetic (TM) surface wave across the first surface, or receive a transverse magnetic (TM) surface wave.

24. The DAISA of claim 21 wherein the surface-wave feed is adapted to transmit a transverse electric (TE) surface wave across the first surface, or receive a transverse electric (TE) surface wave.

* * * * *